United States Patent [19]

Haussels

[11] Patent Number: 4,620,342

[45] Date of Patent: Nov. 4, 1986

[54] METHOD OF MANUFACTURING SWIVEL BEARING FOR SWIVEL CASTERS AND SWIVEL BEARINGS MANUFACTURED ACCORDINGLY

[75] Inventor: Berthold Haussels, Wermelskirchen, Fed. Rep. of Germany

[73] Assignee: Haco-Rollen-Vertrieb GmbH & Co. KG, Wermelskirchen, Fed. Rep. of Germany

[21] Appl. No.: 760,733

[22] PCT Filed: Nov. 8, 1984

[86] PCT No.: PCT/DE84/00236

§ 371 Date: Jul. 9, 1985

§ 102(e) Date: Jul. 9, 1985

[87] PCT Pub. No.: WO85/02151

PCT Pub. Date: May 23, 1985

[30] Foreign Application Priority Data

Nov. 12, 1983 [DE] Fed. Rep. of Germany ....... 3341063

[51] Int. Cl.$^4$ ............... B60B 33/00; B21D 53/10; F16C 19/02; F16C 33/00
[52] U.S. Cl. ............... 16/18 R; 16/DIG. 42; 29/149.4 A; 29/149.5 R; 29/431; 29/511; 384/490; 384/504

[58] Field of Search ........... 29/149.5 R, 149.4 R, 29/149.4 A, 431, 510, 511, 515; 16/18 R, 18 A, 18 B, 20, 29, 40, 45, DIG 42; 384/490, 494, 504; 308/8.1, 245

[56] References Cited

U.S. PATENT DOCUMENTS

| 1,403,367 | 1/1922 | Whitney | 384/504 |
| 1,421,647 | 7/1922 | Wolfs | 16/18 R |
| 1,743,255 | 1/1930 | Vervoort . | |
| 1,821,642 | 9/1931 | Johnson . | |
| 1,829,862 | 11/1931 | Johnson | 29/148.4 A |
| 3,428,378 | 2/1969 | Divine et al. | 29/149.5 R X |
| 4,398,329 | 8/1983 | Hitchner et al. | 29/149.5 R X |

FOREIGN PATENT DOCUMENTS

| 2010844 | 9/1970 | Fed. Rep. of Germany . | |
| 1605465 | 7/1972 | Fed. Rep. of Germany . | |
| 2252225 | 6/1975 | France . | |
| 245287 | 10/1946 | Switzerland | 02001932/GBX |
| 366664 | 2/1932 | United Kingdom . | |

Primary Examiner—Howard N. Goldberg
Assistant Examiner—Ronald S. Wallace
Attorney, Agent, or Firm—Karl F. Ross; Herbert Dubno

[57] ABSTRACT

The swivel bearing comprises a cup secured on a part of the apparatus and provided with a cylindrical wall which is bent inwardly to hold the outer bearing against the flange on another member, which flange rests upon another set of bearings in the cup.

7 Claims, 5 Drawing Figures

METHOD OF MANUFACTURING SWIVEL BEARING FOR SWIVEL CASTERS AND SWIVEL BEARINGS MANUFACTURED ACCORDINGLY

CROSS REFERENCE TO RELATED APPLICATION

This application is a National Phase Application corresponding to PCT/DE No. 84.00236 filed Nov. 8, 1984 and based in turn on German National Application P No. 33 41 063 filed Nov. 12, 1983 under the International Convention.

FIELD OF THE INVENTION

The invention relates the manufacture of swivel bearings for swivel casters, which consist of a swivel bearing cup which can be fastened upon the supported structure, with a cylindrical cup wall, and a swivel bearing plate journaled in the swivel bearing cup in a swiveling mode between two rows of anti-friction bearing elements and which can be connected to the caster fork.

BACKGROUND OF THE INVENTION

Known swivel bearings or swivel casters of the above type, e.g. as described in DE-PS No. 16 05 465 or the DE-GM No. 82 28 224, are manufactured by first inserting the swivel bearing plate with the two bearing rows with the anti-friction elements realized as balls, into the essentially cylindrical cup wall which on its one end is bent over inwards, and then welding or in rarer cases riveting the cup to a fastening plate at the bottom of the swivel bearing cup, or to a fastening plate which forms this bottom. Thereafter the swivel bearing cup is frequently subjected to surface finishing such as galvanizing or the like. Experience has shown that the final welding or riveting of the wall of the swivel bearing cup to the bottom of the cup leads not infrequently to an undesired warping of the material, and to a consequent excessive or insufficient bearing play between the swivel bearing cup and the swivel bearing plate. This in turn causes irregular running and rotational stiffness of the swivel bearing, and above all gives rise to irregular and therefore increased loading, with consequent decreased operating life of such swivel bearings. Similar deleterious effects are caused by other surface finishing steps for the swivel bearing cup, whether they include immersion or spraying, upon the running properties of the balls.

OBJECT OF THE INVENTION

The principle object of the invention is to provide a swivel bearing for swivel casters which does not exhibit the above-mentioned disadvantages, but rather can be manufactured without material warpage, with good running properties, and higher loadbearing capability.

SUMMARY OF THE INVENTION

In accordance with the invention, this object is achieved in that the anti-friction elements and the swivel bearing plate are inserted into the swivel bearing cup through an open end thereof and which is initially provided with an entirely cylindrical wall, and that subsequently the cylindrical cup wall is formed (bent) over towards the interior at its free end or mouth. For the invention it is therefore essential that the anti-friction elements, usually bearing balls and the swivel bearing plate be placed in the appropriately preformed swivel bearing cup provided with an entirely cylindrical wall extending axially beyond the row of balls proximal to the mouth, and that only thereafter the cup wall be formed over on its free end. This forming over can be executed in such careful manner by means of appropriate forming-over tools that the correct running play is ensured and the running properties of the swivel bearing are not impaired. In particular, any material warpage due to a welding is avoided. In addition, portions of the swivel bearing cup and also of the swivel bearing plate can be surface finished, e.g. galvanized, before the forming-over operation, since the resulting appearance need is not be affected by the forming-over.

The swivel bearing cup produced in accordance with the invention consists advantageously, in addition to the cylindrical cup wall, of a suitably formed single-piece sheet metal part, where the bottom of the cup may be uninterrupted, or may be provided with a central attachment opening. A swivel bearing cup so constituted is of extremely simple conformation and producibility.

The swivel bearing cup may also consist, in customary manner, of a fastening plate which forms the bottom of the cup, and a cup wall welded or riveted thereto; in this case as well, the insertion of the swivel bearing plate or flange and the bearing balls into the swivel bearing cup takes place whith initially entirely cylindrically-shaped cup wall, and the latter is only then provided with the inwardly turned formed-over rim.

Finally, one arrives at a very suitably and simply constituted construction of a swivel bearing for a swivel caster, where both ball bearing rows have balls which are of the same diameter, the balls being guided on the inside in bearing grooves on the rim of the swivel bearing plate arrayed on top of each other, and on the outside on the one hand in the formed-over groove provided by the formed-over rim, and on the other hand by an annular groove provided in the wall forming the bottom of the swivel bearing cup, i.e. an end wall thereof.

BRIEF DESCRIPTION OF THE DRAWING

The drawing shows several swivel bearings for swivel casters produced and constituted in accordance with the invention. In the drawing.

SPECIFIC DESCRIPTION

Figure 1:
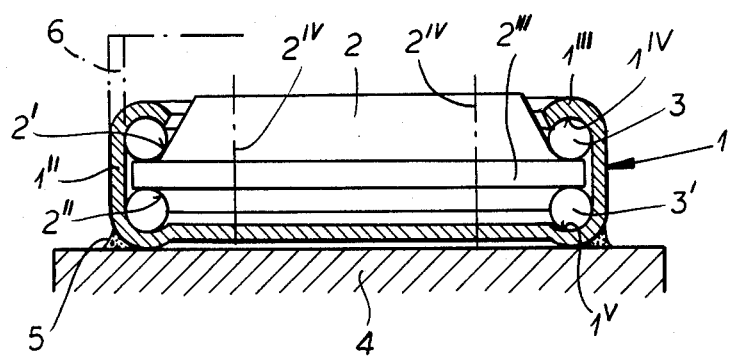
FIG. 1 is an axial section through a first embodiment with a swivel bearing cup made in one piece.

The swivel bearing for swivel caster shown in FIG. 1 has a swivel bearing cup 1 with cup bottom 1', and are essentially cylindrical cup wall 1", which is provided on its free end with and inwardly bent formed-over rim 1'''. The entire swivel bearing cup has a one-piece configuration. It consists preferably of suitably drawn sheet steel. Within the swivel bearing cup 1 is the swivel bearing plate 2 or flange 2 journaled in swiveling fashion between the two bearing ball rows 3, 3'. The bearing ball rows 3, 3' have the same diameter, and their bearing balls are all of the same diameter. The balls are guided on the inside by the races 2' and 2" respectively, arrayed one on top of the other in swivel bearing plate 2, lying above and below of the marginal lip 2''' which is disposed near cup wall 1". Outwardly, the balls of the races 3''' are guided on one side by the formed-over race $1^{IV}$ formed in the formed-over rim 1''' and on the other side by the annular groove $1^V$ formed into cup bottom 1' and lying immediately adjacent the planar cup wall 1" constituting the remainder of this bottom.

In edgewise direction, the swivel bearing cup 1 is solidly fastened to a fastening plate 4 lying in intimate contact with the edge of its bottom 1', for example by means of the circumferential weld bead 5. The fastening plate 4 can, in known manner, be rigidly connected with a mobile implement which is to be equipped with such swivel casters, e.g. garbage container, instrument cart, hospital bed etc. The swivel roller fork which carries the swivel caster wheel is fastened to the swivel bearing plate 2 via screw clearance holes $2^{IV}$ represented by dot-and-dash.

In manufacture of the swivel bearing for swivel caster shown in FIG. 1, the swivel bearing cup 1 initially has a purely cylindrical cup wall as shown by the dot-and-dash representation in location 6. In this form, the cup is first welded to fastening plate 4, and as opposed to the eventual position in use (FIG. 5), placed in an upside-down receiving position as shown in FIG. 1, in which the cup 1 is open towards the top. Thereupon the bearing balls of the lower bearing row 3', the swivel bearing plate 2 and finally the balls of the upper bearing row 3 are put in place. Finally, by means of an appropriate forming tool, the free end of the cup wall 1" is formed over, and shaped into formed-over rim 1''', respectively. The bearing is then ready for use, so that it can be connected via bearing plate 2 with the caster fork and via fastening plate 4 with the associated implement.

Figure 2:
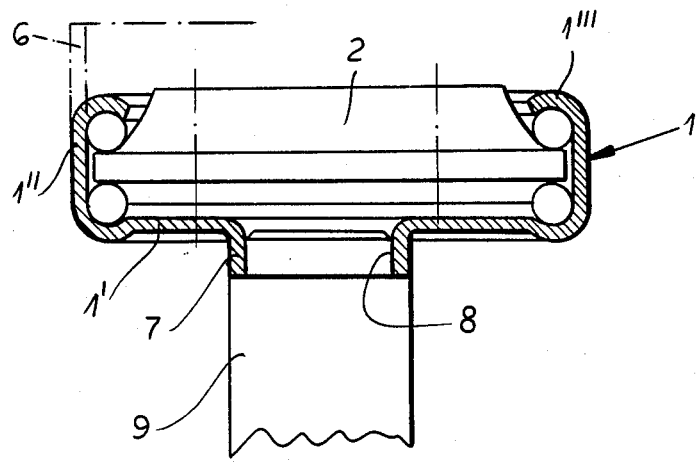
FIG. 2 is a section similar to FIG. 1, but of an embodiment whose cup bottom has an aperture for an insertion fastening.

The swivel bearing for a swivel caster shown in FIG. 2 differs from the one shown in FIG. 1 only in that the bottom 1' of its cup is not closed, but is provided with a centrally formed attachment hub 7, into whose opening 8 the appropriately reduced end of the implement stem 9, or similar (item), can be inserted. This insertion fastening may be secured by additional means, e.g. press fit, welding, pinning or the like. In this case also, after the bearing cup 1 is fastened to implement stem 9, the procedure followed is that which has been described above. Thus, while cup wall 1" is still cylindrical throughout, the bearing balls and the swivel bearing plate 2 are inserted into the cup, only then is the wall 1" formed over on its upper edge. Since this forming-over can be carried out in a very careful manner, there will be no warping of the material, nor mutual displacement of the mating components of the swivel bearing in this connection. Also, a previous surface treatment of the components of the swivel bearing cup will not be affected by the final forming-over of the rim 1''' of the cup wall 1".

Figure 3:
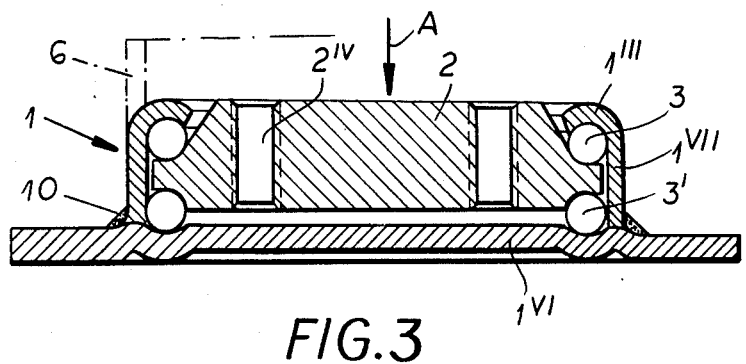
FIG. 3 is an axial section of a third embodiment of a swivel bearing with a swivel bearing cup made in two pieces.
Figure 4:
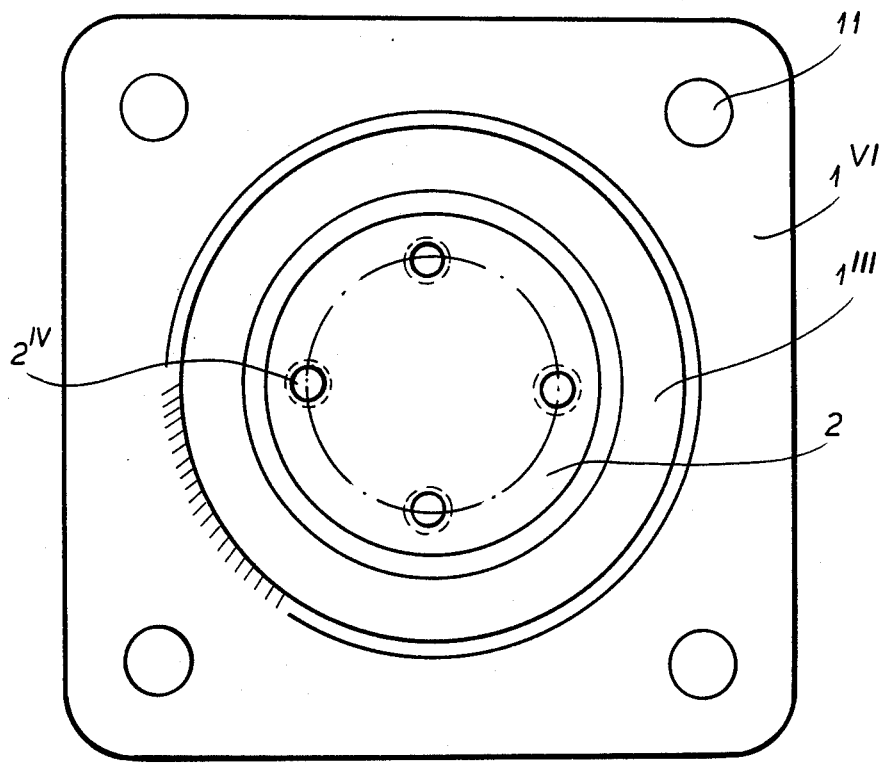
FIG. 4 is a top view of FIG. 3 taken in the direction of arrow A.

In the embodiment of FIGS. 3 and 4, the swivel bearing cup 1 consists of the fastening plate $1^{VI}$ which forms its bottom and has a comparatively heavy wall, and the cup wall $1^{VII}$, connected therewith by weld bead 10, and initially cylindrical throughout. Thus, the wall of the cup initially consists of a simple tubular section, which may be welded to the fastening plate $1^{VI}$ equipped with clearance holes 11 for screws or alternatively, can be riveted thereto. In this case also, the bearing balls of the ball bearing rows 3', 3 and the swivel bearing plate 2 are inserted with the position of the swivel bearing cup 1 upwardly open as shown in FIG. 3, and thereafter the cup wall $1^{VII}$ is formed over at its upper end, that is the formed-over rim 1''' is produced. In this case as well as in all the others previously described, the forming-over of the edge of the wall of the cup can be carried out in such manner that the optimal bearing play is obtained.

Figure 5:
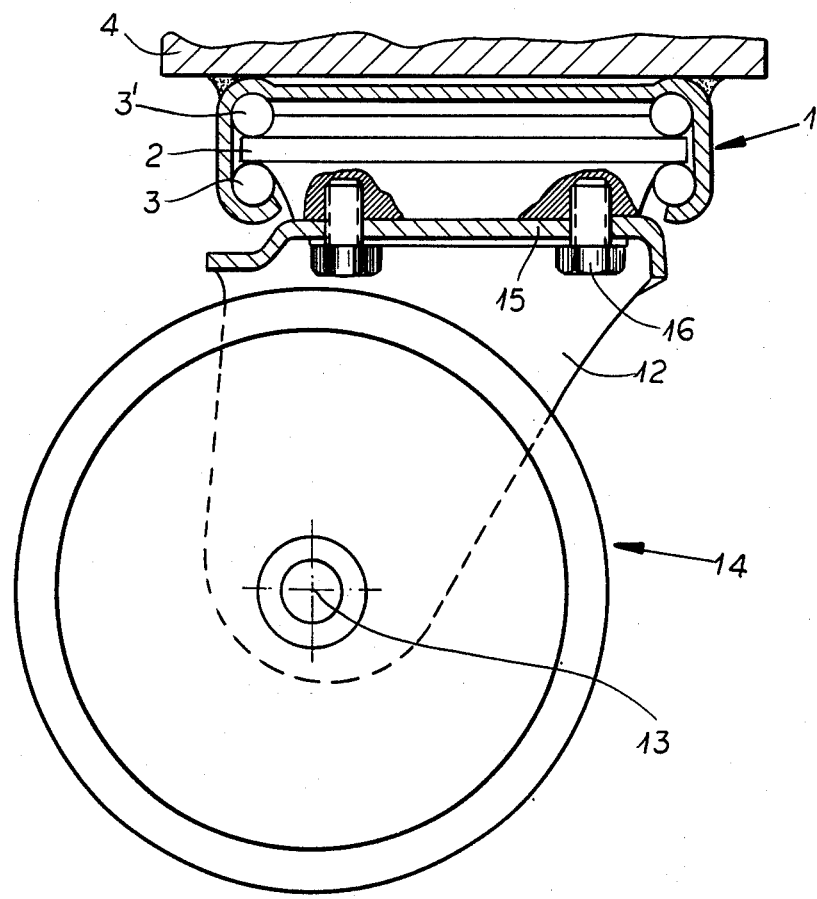
FIG. 5 is a side elevation of a swivel caster equipped with a swivel bearing cup according to FIG. 1 and partly broken away.

FIG. 5 shows a swivel caster attached to a swivel bearing cup 1, whose fork carries the caster wheel 14 rotatable about axis 13 and is fastened to the bearing plate 2 by means of screws 16 which penetrate its back 15.

I claim:

1. A method of making a swivel bearing for a swivel caster which comprises:

initially forming a metallic cylindrical cup wall upon a cup bottom so that the cup wall opens away from said bottom and extends axially by a distance above said cup bottom exceeding an axial dimension of a journal assembly consisting of a pair of circular arrays of ball bearings directly sandwiching a circular swivel plate adapted to rotatably carry a caster between them;

inserting said journal assembly through an open end of said cup wall into the cup formed by said wall and by said bottom whereby one of said arrays lies in direct contact with said bottom and the other of said arrays is spaced below an edge of said wall; and deforming an upper margin of said open end of said cup wall inwardly through at least 90° over the other of said arrays for retaining said assembly in said cup, while directly defining a race for the bearings of said other array with the inwardly deformed margin, and establishing the running play for both of said arrays of bearings, so that the inwardly deformed upper margin has an inner diameter less than that of said plate and said arrays.

2. Swivel bearing for a swivel caster made by the method of claim 1 with a swivel bearing cup exhibiting a cylindrical cup wall formed over inwardly on its free end and a swivel bearing plate journaled therein by means of two rows of bearing balls, characterized by the fact that the swivel bearing cup (1) inclusive of its cylindrical cup wall, consists of a one-piece, suitably formed sheet metal element (1', 1").

3. Swivel bearing for swivel caster according to claim 2, characterized by the fact that the swivel bearing cup (1) exhibits an uninterrupted cup bottom (1').

4. Swivel bearing for swivel caster according to claim 3, characterized by the fact that the swivel bearing cup (1) is on its edge side attached or welded to a fastening plate (4) adjacent to the edge of its bottom.

5. Swivel bearing for swivel caster according to claim 2, characterized by the fact that the swivel bearing cup (1) has a cup bottom (1') with an integrally formed central opening for plug-in attachment (8).

6. Swivel bearing for swivel caster manufactured according to claim 1 with a swivel bearing cup having a cylindrical wall bent inwards on its free end and a swivel bearing plate journaled therein by means of two rows of bearing balls, characterized by the fact that the swivel bearing cup (1) consists of a fastening plate ($1^{VI}$) which forms the bottom of the cup, and a cylindrical cup wall (1″) with inwardly oriented formed-over rim (1‴) welded or riveted thereto.

7. Swivel bearing for swivel caster according to one of the claim 2, characterized by the fact that the two rows of bearing balls (3, 3′) as well as their balls have respectively diameters of equal size, and the latter are guided inwardly by grooves (2′, 2″) disposed inwardly on the edge of the swivel bearing plate (2) one above the other, and outwardly on the one hand by the formed-over groove ($1^{IV}$) formed by the formed-over rim (1‴), and on the other hand by a circular groove ($1^{V}$) provided in the bottom of the swivel bearing cup (1′) in the vicinity of the wall.

* * * * *